United States Patent [19]

Bradley

[11] Patent Number: 4,677,548
[45] Date of Patent: Jun. 30, 1987

[54] LSI MICROPROCESSOR CHIP WITH BACKWARD PIN COMPATIBILITY AND FORWARD EXPANDABLE FUNCTIONALITY

[75] Inventor: John J. Bradley, Framingham, Mass.

[73] Assignee: Honeywell Information Systems Inc., Waltham, Mass.

[21] Appl. No.: 655,111

[22] Filed: Sep. 26, 1984

[51] Int. Cl.$^4$ .................. G06F 1/00; G06F 13/00
[52] U.S. Cl. ........................................ 364/200; 371/11
[58] Field of Search ... 364/200 MS File, 900 MS File

[56] References Cited

U.S. PATENT DOCUMENTS

| | | | |
|---|---|---|---|
| 2,706,222 | 4/1955 | Bjornson | 179/18 |
| 4,145,760 | 3/1979 | Ward et al. | 365/226 |
| 4,148,099 | 4/1979 | Lauffer et al. | 365/226 |
| 4,159,541 | 6/1979 | Ward et al. | 365/233 |
| 4,168,537 | 9/1979 | Uchida | 365/154 |
| 4,198,698 | 4/1980 | Ong | 365/226 |
| 4,250,407 | 2/1981 | Dorey et al. | 307/209 |
| 4,361,868 | 11/1982 | Kaplinsky | 364/200 |
| 4,388,685 | 6/1983 | Kotok | 364/200 |
| 4,504,926 | 3/1985 | Toyoda | 364/900 |

OTHER PUBLICATIONS

"A Smart Dynamic Memory Needs Only Four Pins", by Don Lauffer, Electronics, Oct. 11, 1979, pp. 144–150.

*Primary Examiner*—Archie E. Williams
*Assistant Examiner*—Michael J. Ure
*Attorney, Agent, or Firm*—Faith F. Driscoll; John S. Solakian

[57] ABSTRACT

A chip implemented in new technology is designed to include expandable levels of new functionality. The chip includes compatibility circuits which connect to a number of pins which are unused in the chip it replaces in an existing computer system. The compatibility circuits connect to those internal parts of the new chip that contain the newly added or altered levels of functionality. The new chip is installed in the existing computer system just as the prior chip. When so installed, the compatibility circuits enable the new chip to operate in the same manner as the replaced chip but at high speed and with improved performance. When the new chip is installed in the system for which it was designed, the compatibility circuits enable the chip to operate with a selectable level of new functionality at the same higher speed and improved performance.

20 Claims, 11 Drawing Figures

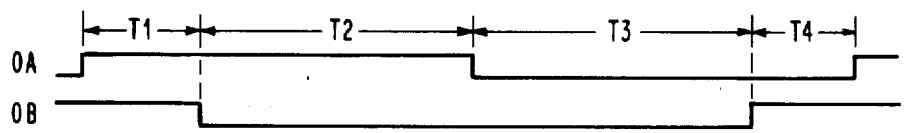

LSI MICROPROCESSOR CHIP WITH BACKWARD PIN COMPATIBILITY AND FORWARD EXPANDABLE FUNCTIONALITY

RELATED APPLICATIONS

Copending patent application of Eugene Nusinov and John J. Bradley, titled "LSI Microprocessor Chip with Backward Pin Compatibility", Ser. No. 06/596,756, filed on Apr. 4, 1984, and assigned to the same assignee as named herein.

BACKGROUND OF THE INVENTION

1. Field of Use

This invention relates to data processing and more particularly to microprocessor chips.

2. Background

With the significant and rapid changes in technology, manufacturers of minicomputer systems find it necessary to upgrade their systems more frequently than before. The upgrading process has taken the form of introducing new systems of retrofiting of old systems or a combination of both.

The introduction of new microprocessor chip designs has been a significant driving force in computer system upgrading. Constantly, chip manufacturers are designing new chips that offer increased functionality and higher speeds. These new faster chips are in turn being made the basis of new system designs.

The chip manufacturers and computer system manufacturers have recognized and continue to recognize the importance of compatibility between microprocessors. For example, several manufacturers of 32-bit microprocessors introduced in 1983 have emphasized their capability to run software written for microprocessors that had preceded them.

For the most part, compatibility in such instances has been achieved by emulation through microprogramming, by modifying portions of the operating system, or by utilizing similar architectures. While such compatibility has been achieved, these chips are still able to provide only a downward software compatibility. This means that the same software written for 8- or 16-bit microprocessor chips can be executed on 32-bit chips.

However, as chip designs continue to evolve minicomputer manufacturers still will be required to maintain inventories of those different microprocessor chips utilized in new and old minicomputer designs. That is, downward software compatibility does not require downward hardware compatibility.

In fact, the opposite is usually the case. This means that in order for an older minicomputer system to take advantage of a new chip, it is necessary to redesign or retrofit the system to accept the new chip notwithstanding the compatibilities in chip pin assignments. The reason is that the new chip besides being faster usually includes new functionality which enhances it marketability. This can prove costly in terms of both equipment maintenance and inventory.

Accordingly, it is a primary object of the present invention to provide an improved design methodoloy and apparatus for providing compatibility in chip designs.

It is a more specific object of the present invention to provide a chip which is usable in both new and older systems without requiring changes to be made to such older systems.

SUMMARY OF THE INVENTION

The above and other objects are achieved in a preferred embodiment of a microprocessor chip which incorporates the apparatus and methodology of the present invention. The chip implemented in large scale integration (LSI) using advanced techniques is designed to include a number of compatibility circuits which connect to a corresponding number of pins which correspond to unused pins of the chip it is to replace in an existing computer system. Each compatibility circuit connects to those internal parts of the new LSI chip that have newly added or altered functionality. When the new LSI chip is plugged into the existing minicomputer system, the compatibility circuits inhibit the operation of the added/altered functionality. At the same time, these circuits condition other parts of the chip, in addition to the added functionality to the extent required to operate in the same manner as the replaced chip, but with the higher speed and improved performance attainable by the use of new technology. When the new chip is placed in the system for which it was designed, an external circuit is connected to the compatibility circuit which permits the chip to operate with the desired expanded level functionality at the same higher speed and improved performance. Additionally, each of the compatibility circuits are connected to be clocked by timing signals generated within the system so as to reduce to a minimum the number of unused pins required for the different levels of functionality.

More particularly, in the preferred embodiment, the new LSI microprocessor chip employs more advanced solid state techniques (new technology) in its construction. This resulted in superior speed, improved performance, lower power consumption and simpler fabrication as compared to the prior LSI microprocessor chip. Additionally, the new chip incorporates expandable new functionality which is reflected in an enhanced addressing capability. This is reflected in the assignment of additional pins for other address bits. The additional pins correspond to unused pins of the chip being replaced. Thus, the new chip has complete hardware downward compatibility with the old chip. That is, the new chip has backward pin compatibility with the old chip.

Because of the above built in backward pin compatibility, the chip of the present invention can be used in two distinct systems (i.e., new and existing system designs) without having to make any changes in the design of such systems. Thus, inventory and maintenance requirements are reduced significantly. Also, the need to retrofit existing systems to utilize the new chip has been eliminated.

The novel features which are believed to be characteristic of the invention both as to its organization and method operation, together with further objects and advantages will be better understood from the following description when considered in connection with the accompanying drawings. It is to be expressly understood, however, that each of the drawings are given for the purpose of illustration and description only and are not intended as a definition of the limits of the present invention.

BRIEF DISCLOSURE OF THE DRAWINGS

FIGS. 1a and 1b are pictorial representations of chips used to illustrate the principles of the present invention.

FIGS. 2a, 2c and 2b, 2d, respectively, show in block diagram form, portions of the microprocessor chips of FIGS. 1a and 1b.

FIGS. 3a through 3d show the formats of segment descriptors processed by the chips of FIGS. 2a and 2b.

FIG. 4 shows the timing portions of the chip of FIG. 2b constructed according to the principles of the present invention.

DESCRIPTION OF THE PREFERRED EMBODIMENT

Figure 1B:
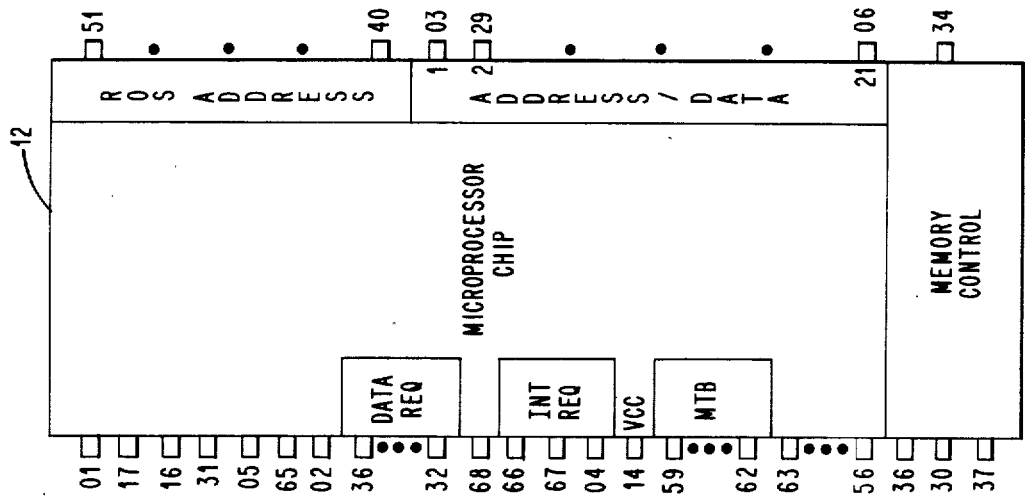
Figure 1A:
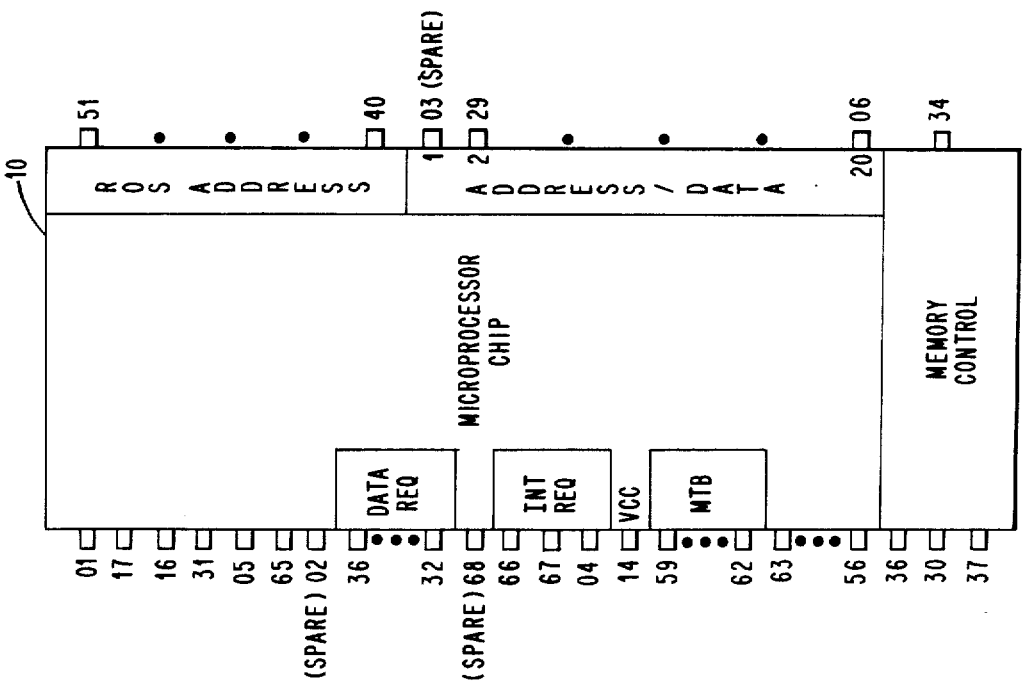

FIGS. 1a and 1b show in pictorial form the input and output pin connections of the microprocessors fabricated on single integrated circuit substrates or chips. As shown, each chip has 68 pins, several of which have no connections within the minicomputer system in which they are used. These pins are designated as spares in FIGS. 1a and 1b.

Each of the chips 10 and 12 have a number of unshared pins as for example pins 1, 14, 16, 17, 31 and 65. These pins are connected to receive supply voltages, clocking signals, timer and clear signals, as shown. A second group of pins of both chips 10 and 12 connect to the address and data interface lines of the microprocessor bus. The group includes ROS address bus pins 40 through 51 and the address/data bus pins 6 through 29. As explained herein, LSI chip 12 also has pins 3, 2 and 68 connected to the address interface lines while pins 3, 2 and 68 of chip 10 remain unconnected in its system.

A third group of pins of chips 10 and 12 connect to the monitor/interrupt and memory management unit (MMU) circuits. The group includes data request pins 32 through 36, major branch test group pins 59 through 62, interrupt request pins 04, 67 and 66, control input pins 56 through 63 and memory control input pins 30, 37 and 36, in addition to a memory error violation output pin 34.

It is important to note that a number of pins, such as pins 2, 3 and 68 of chip 10, are unconnected in its system, while these same pins in chip 12 are connected in its system. Each of the pins 2, 3 and 68 of chip 12 is connected to receive a signal which defines in which system the chip is being used (i.e., its application in an existing or new minicomputer system). As explained herein, when chip 12 is included in an existing system, pins 2, 3 and 68 are unconnected as in chip 10. However, when chip 12 is included in a new system, either pin 2, 3 or 68 is connected to an externally applied reference input signal which will be activated during chip control input time. Additionally, pins 2, 3 and 68 are connected to provide levels of additional or expanded functionality as explained herein during chip system output time.

FIGS. 2a, 2c and 2b, 2d illustrate in part the organizations of chips 10 and 12. The microprocessor of chip 10 is organized to be functionally equivalent to the central processing unit described in U.S. Pat. No. 4,340,933 which issued July 20, 1982 and is assigned to the same assignee as named herein. Briefly, chip 10 includes a memory management unit MMU 10-2, the memory control circuits of block 10-4 and interrupt processing circuits of block 10-6. As seen from FIG. 2c, MMU 10-2 includes a 12-bit adder 10-20 and the error circuits of block 10-24. MMU 10-2 operates to translate 20-bit memory virtual (logical) addresses into 20-bit physical addresses utilizing segment descriptors having the format of FIG. 3a.

These descriptors are stored in a 31-word by 32-bit register file RAM. Considering the descriptor format in greater detail, it is seen that bit 0 is a validity bit. When bit 0 is a ZERO ($\overline{A0}=1$), an OR circuit of block 10-24 signals that the segment is undefined or invalid by forcing an unavailable resource signal T15E to a ONE. The fields containing bits 1-3 and bits 22 must be all ZEROS or the MMU 10-2 signals that the segment is undefined. That is, this check is performed by OR circuit of block 10-24 forcing signal T15E to a ONE when any one of the bits A1, A2, A3 or A22 is a ONE.

Bits 4-15 constitute a 12-bit segment base which the MMU adder 10-20 adds to an 8-bit block number field (BI0-7) of the virtual or logical address, the sum of which is applied to output address/data bus of chip 10. The logical address on the internal bus consists of 20 bits formatted, as shown below.

|  | D...A | 0...7 | 8...15 |
|---|---|---|---|
| LARGE SEGMENT ADDRESS | SEG. NO. | BLOCK NO. | OFFSET |

An unchanged offset field of the logical address is appended to the 12-bit sum applied to chip pins 29-18 to create the 20-bit physical address. When the addition results in a carry out (CY3) from adder 10-20, MMU 10-2 signals that the segment being accessed is beyond the physical size of memory. This check is performed by OR circuit of block 10-24 forcing signal T15E to a ONE when signal CY3 is a ONE.

Bits 16-21 are three 2-bit ring protection fields which define memory access rights (i.e., RR-read, RW-write and RE-execute). Since these fields are not pertinent to an understanding of the present invention, they are not discussed herein.

Lastly, bits 23-31 are a 9-bit size field for the memory segment associated with the segment descriptor. MMU 10-2 compares the size field to the 9-bit block number field to verify that the descriptor size field is equal to or greater than the binary value of the bits contained in the block number field of the logical address. As discussed herein, this size check verifies that the block number of the logical address does not exceed the assigned number of blocks specified in the segment descriptor. When this condition is not met, signal CMP is forced to a ONE. This check is performed by OR circuit of block 10-24 forcing signal T15E to a ONE when signal CMP is a ONE. This ensures that normal access is to an available area of memory. For further details about how such checking may be accomplished, reference may be made to U.S. Pat. No. 4,378,591 issued Mar. 29, 1983 which is assigned to the same assignee as named herein.

As discussed above, during such address translation operation, MMU 10-2 performs the number of checks indicated, and generates appropriate error signals, such as signal T15E indicating whether or not memory access is legal or valid. The error signal T15E is stored one of several control flip-flops (not shown) included in MMU 10-2.

The output from this control flip-flop is applied by MMU 10-2 as appropriate trap vector signals to the interrupt processing circuits of block 10-6. The trap vector signals are processed in the manner described in U.S. Pat. No. 4,074,353, issued Feb. 14, 1978, and is assigned to the same assignee as named herein. Additionally, the same error signal T15E generated by MMU 10-2 is applied to the memory control circuits of block 10-4. These circuits in turn apply an output signal MEMKIL to pin 34 of chip 10 which is used to prevent the alteration of information stored in the memory units within the system when MMU 10-2 has detected an illegal access.

For further information regarding the chip's organization and construction, reference may be made to the copending patent application of Daniel A. Boudreau, et al., Ser. No. 06/509,265, entitled "Memory Architecture for Facilitating Optimum Replaceable Unit Detection and Diagnosis", field on June 29, 1983 and to the article "The LSI-6 A 16-Bit Minicomputer Compatible Microprocessor" by John DeFalco, Peter Heslin and Ronald Springer, published in the Proceedings of The 1982 Custom Integrated Circuits Conference by the Institute of Electronic and Electrical Engineers (IEEE), Copyright, 1982.

Microprocessor chip 12 is organized to have a number of levels of expanded and new functionality in contrast to that of the chip 10 microprocessor. As seen from FIG. 2d, MMU 12-2 includes a 15-bit adder 12-20 and the error circuits of block 12-24. MMU 12-2 operates to translate 20-bit virtual memory addresses into 20-bit, 21-bit, 22-bit or 23-bit physical addresses utilizing the descriptors formatted as shown in FIGS. 3a through 3d, respectively.

The new (virtual) translation capability reflected by one, two or three additional address bits permits direct access to a larger segmented memory address space. That is, as seen from FIG. 2d, MMU adder 12-20 adds the 12-bit, 13-bit, 14-bit or 15-bit base address field of the segment descriptor to a 9-bit block member derived from the logical address applied to the chip's internal bus. An unchanged offset field of the logical address is appended to the 12-bit, 13-bit, 14-bit or 15-bit sum applied to chip pins 29 through 18 and 3, 2 or 68 to create the 20-bit, 21-bit, 22-bit or 23-bit physical address.

Figures 2A, 2B:
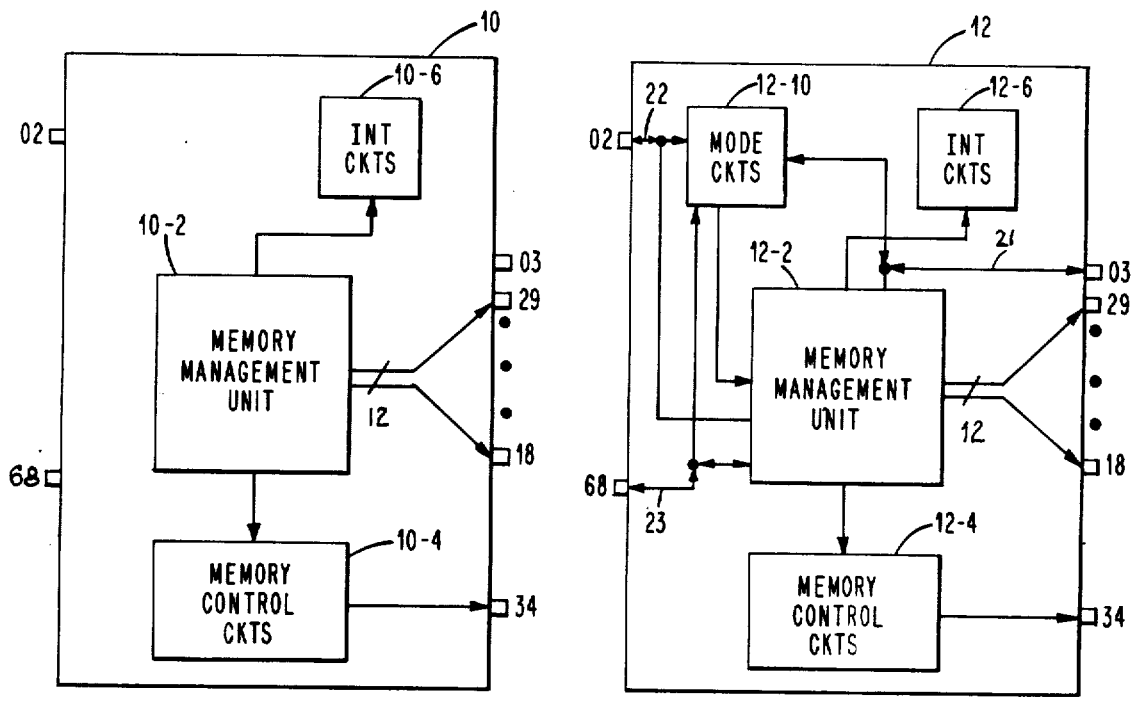
Figure 2C:
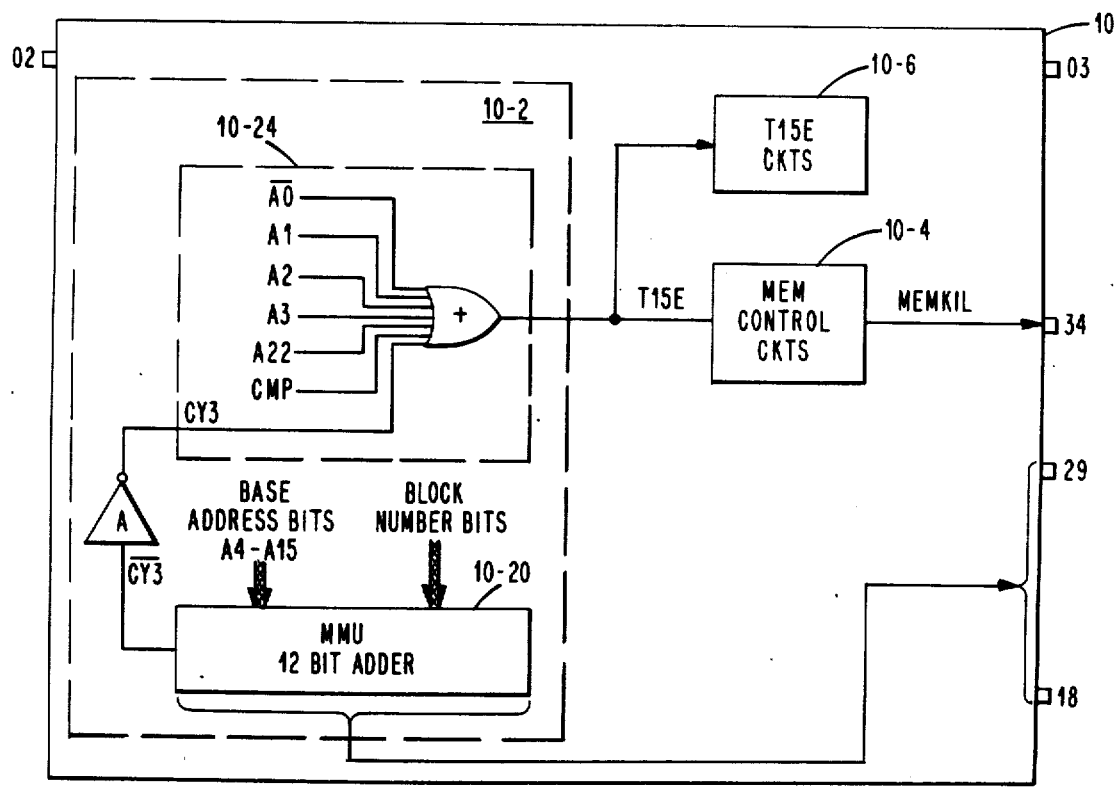
Figure 2D:
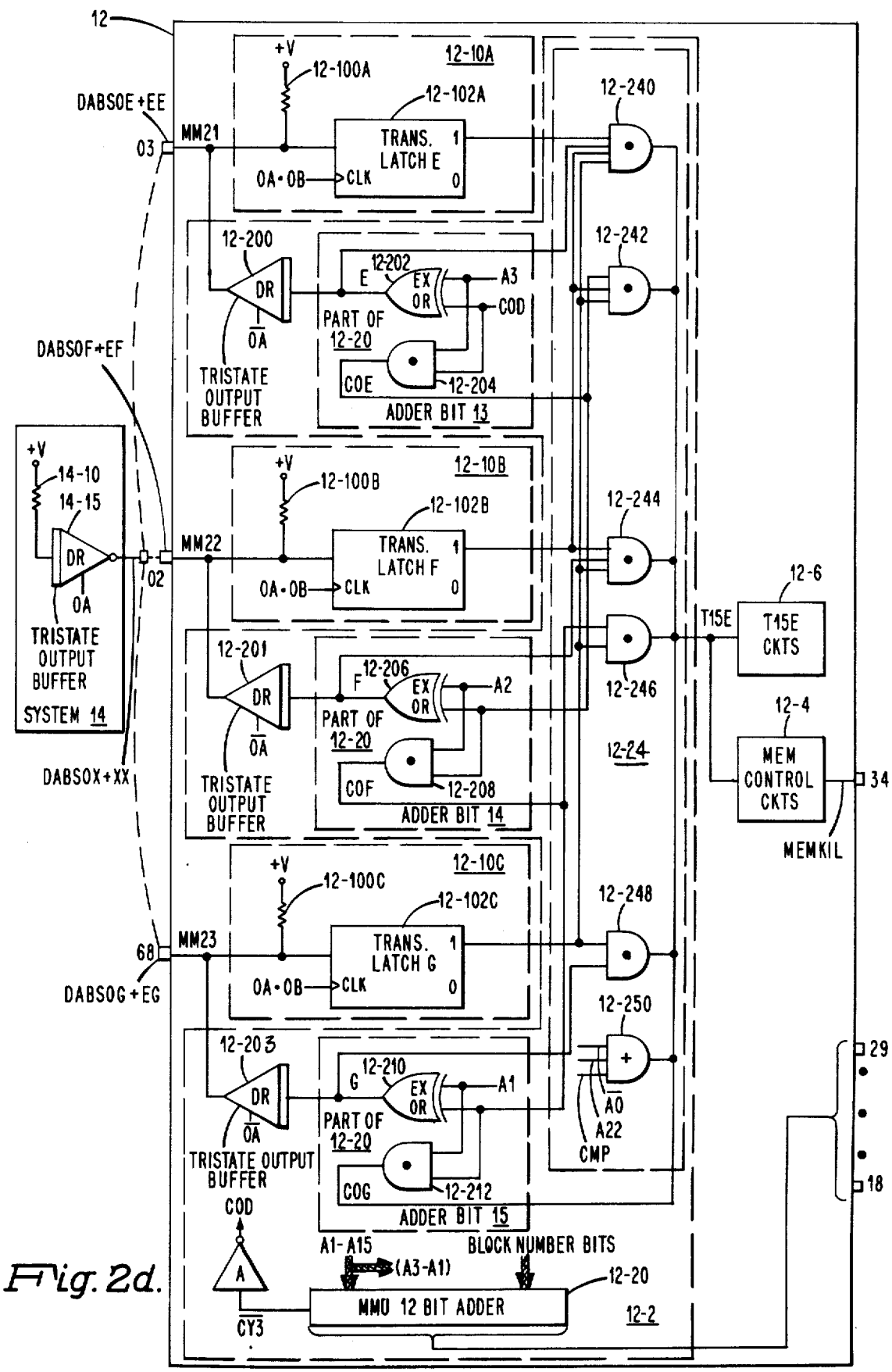

As seen from FIG. 2d, chip 12 includes the plurality of compatibility circuits 12-10A, 12-10B and 12-10C of block 12-10, the memory control circuits of block 12-4 and interrupt circuits of block 12-6. Each of the compatibility circuits 12-10A, 12-10B and 12-10C of block 12-10 connect to pins 3, 2 and 68, respectively. As explained herein, they condition the remaining circuits of MMU 12-2 of chip 12 to operate within either of two systems. That is, the circuits 12-10A, 12-10B and 12-10C of block 12-10 provide the appropriate signals for conditioning the error circuits of block 12-24 and adder 12-20 to operate in either system.

It will be noted that error circuits of block 12-24 have been modified from the circuits of block 10-24. However, notwithstanding this, the OR circuit of block 12-24 essentially has the same number of inputs as the OR circuit of block 10-24. The reason, as explained in detail herein, is that the thirteenth, fourteenth and fifteenth stages (new functionality) are implemented to generate signals which produce the correct error responses for either system. The signals for either system are established by the compatibility circuits 12-10A, 12-10B and 12-10C of block 12-10.

As seen from FIG. 2d, address bits A3, A2 and A1 are no longer inputs to the circuits of block 12-24 (no longer part of the must be zero (MBZ) check). That is, each of the address bits A3, A2 and A1 are inputs to a different one of the expanded last stages of adder 12-20, as shown. Also, the circuits of block 12-24 receive the carry out signal CYOUT from these adder stages instead of carry out signal CY3. Lastly, the circuits of block 12-24 receive the sum bits which correspond to signals MM21, MM22 and MM23 produced by the adder stages as a function which system, chip 12 is operating and the level of functionality selected as defined by the compatibility circuits 12-10A, 12-10B and 12-10C of block 12-10.

In greater detail, each of the compatibility circuits 12-10A, 12-10B and 12-10C connected to a different one of the pins 3, 2 and 64, respectively, as shown. Each circuit includes a transparent latch (i.e., 12-102A, 12-102B and 12-102C) and a resistor to voltage +V (12-100A, 12-100B and 12-100C). Each latch is clocked by the combination of phase A and phase B, timing signals OA and OB received from the system clock, not shown. When both phase A and phase B timing signals are high (ONES), the state of the pin to which it connects is going to be clocked into the latch. That is, latch E, F and G will store that fact of whether or not pins 3, 2 and 64, respectively, were activated low.

In greater detail, only one of the previously unused pins is activated low via data address bus output signal DABSOX+XX through an external clocked driver circuit of system 14. As shown, the driver circuit includes an inverting tristate buffer circuit 14-15, such as part number 74S240 manufactured by Texas Instruments Inc. The driver input connects to a voltage +V through a pull up resistor 14-10. The tristate buffer circuit 14-15 is enabled when phase A is high (i.e., when signal OA=1).

When pin 3 is wired to the external tristate buffer circuit 14, data address bus output E, enable E signal DABSOE+EE is applied to pin 3. As explained herein, this enables adder stage 13 to generate an output for the twenty-first bit MM21. Similarly, when pin 2 is wired to the external tristate driver circuit 14, data address bus output F, enable F signal DABSOF+EF is applied to pin 2. This enables both adder stages 13 and 14 to generate outputs for the twenty-first and twenty-second bits MM21 and MM22. Lastly, when pin 68 is wired to external tristate driver circuit 14, data address bus output G enable G signal DABSOG+EG is applied to pin 2. This enables adder stages 13, 14 and 15 to generate outputs for the twenty-first, twenty-second and twenty-third bits MM21, MM22 and MM23.

The binary 1 output latch EL connects to one input of an AND gate 12-240 of block 12-24. Latch F connects as one input of AND gates 12-240, 12-242 and 12-244. Latch G connects to one input of AND gates 12-240, 12-242, 12-244, 12-246 and 12-248, as shown.

The AND gates 12-240, 12-240 and 12-248 receive inputs from the sum outputs (E, F and G) of adder stages 13, 14 and 15, respectively. The AND gates 12-242 and 12-246 receive the carry output (COE, COF) from the thirteenth and fourteenth adder stages, respectively.

Each of the adder stages includes an exclusive OR gate (i.e., 12-202, 12-206, 12-210) and an AND gate (i.e., 12-204, 12-208, 12-212). The sum output (E, F, G) of each adder stage is applied via a tristate output buffer stage (i.e., 12-200, 12-201, 12-203) to one of the previously unused pins 3, 2 and 68 to which its corresponding transparent latch connects. The adder stage output is transferred to its output pin during phase A low time (i.e., when signal $\overline{OA}=1$) when its tristate circuit is enabled.

In greater detail, each exclusive OR circuit (i.e., 12-202, 12-206 and adder stage 12-210) generates a binary ONE for its expanded address bit (i.e., MM21, MM22, MM23) when the input address bit (i.e., A3, A2, A1) is a binary ONE and the carry in from the previous stage is a binary ZERO. The same output is generated when the input address bit is a binary ZERO and the carry in from the previous stage (i.e., COD, COE, COF) is a binary ONE. Each adder stage AND gate (i.e., 12-204, 12-208 and 12-212) generates a binary ONE carry out signal (i.e., COE, COF, COG) when both its input address bit (i.e., A3, A2, A1) and the carry in from the previous stage (i.e., COD, COE, COF) are binary ONES.

As mentioned, both the expanded address bit signals (i.e., E, F, G) and carry out signals (i.e., COE, COF, COG) are applied to the error circuits of block 12-24. It will be noted that carry out signal COG of adder stage 15 is an ungated input to these circuits (i.e., directly connected). In addition to the AND gates already discussed, the error circuts further include an OR gate 12-250. The OR gate 12-250 ensures error signal T15E is generated when any one of the signals $\overline{A0}$, A22 and CMP is forced to a binary ONE.

For the purpose of the present invention, the different circuits of FIG. 2d may be assumed to be constructed using MOSFET circuits, as for example, such as those disclosed in the referenced related patent application. For example, each of the transparent latches 12-102A, 12-102B and 12-102C is implemented by a standard configuration which includes a pair of series connected MOSFET inverters and MOSFET transistors. As an input signal is applied to a first MOSFET transistor gated by timing signals $\overline{OA \cdot OB}$ (i.e., time $\overline{T1}$). The output of the transistor is applied to the input of the first inverter while the output of the second inverter is recirculated back to the input of the first transistor through a second MOSFET transistor which is gated by timing signals OA·OB (i.e., time T1).

For further informatin regarding the operation and construction of such MOSFET circuits, reference may be made to the text titled "Introduction to VLSI Systems" by Carver Mead and Lynn Conway, published by Addison-Wesley Publishing Company, Copyright, 1980.

Also, chip 12 is constructed from a more advanced technology than chip 10. that is, chip 12 was developed using a process which takes advantage of smaller geometries resulting in faster circuits and improved performance. More importantly, the smaller geometries provide higher yeilds resulting in reduced costs in manufacturing chip 12.

DESCRIPTION OF OPERATION

With reference to FIGS. 2d, 3a through 3d, the methodology and operation of the present invention will now be described with reference to FIG. 4.

First, it will be assumed that chip 12 has been installed into an existing system which was designed to utilize chip 10 (hereinafter old system). In this case, pins 2, 3 and 68 of chip 12 of FIG. 2d are unconnected. Therefore, the signals applied to compatibility circuit latches E, F and G of blocks 12-10A, 12-10B and 12-10C are at approximately voltage V representative of a binary ONE. Therefore, signal T15E will change state as a function of address bits 13, 14 and 15 (i.e., MM21, MM22, MM23) which correspond to the sums of segment descriptor bits 3 (A3), 2 (A2), 1 (A1) and the carry out ($\overline{CY3}$/COD), (COE), (COF) and (COG) from adder stages twelve, thirteen, fourteen and fifteen.

Before describing the different expandable levels of functionality, reference is first made to the timing diagram of FIG. 4. The diagram shows the internal timing utilized by chip 12. Chip 12 uses a two-phase clock signal which consists of phase A and phase B signals OA and OB having the relationship shown. The phase relationship of signals OA and OB determine the functions of the chip's 129 interface lines which are shared among 57 input/output pins. More particularly, phase A signal OA is used by chip 12 and the system in which chip 12 is included to reverse the direction of the I/O drivers. When phase A signal OA is a binary ONE, the ROS data lines and option lines are inputs to chip 12. When phase A signal OA is a binary ZERO, all other shared signals are either inputs or outputs to chip 12. Phase B signal OB is used to latch the signals that were gated with phase A signal OA. When phase B signal OB goes to a binary ZERO, the ROS data and options are latched internally within chip 12. When phase B signal OB goes to a binary ONE, all other shared signals are latched internally.

As seen from FIG. 4, phase A and B signals OA and OB are divided into time intervals T1 through T4. Time T1 is the interval when both phase A and B signals OA and OB are high (i.e., OA·OB = 1). During time T1, the firmware control word is being loaded into chip 12. This sets up the cycle which is going to occur. Time T2 is the interval when phase A is high and phase B is low (i.e., OA·$\overline{OB}$ = 1). During this interval, the MMU MOSFET circuits are precharged while the logical address which will be applied to the internal bus for accessing the correct segment descriptor is being established.

Time T3 is the interval during which both phases A and B are low (i.e., $\overline{OA \cdot OB}$ = 1). At the beginning of this interval, the MMU addition operation takes place. Time 4 is the interval during which phase A is low and phase B is high (i.e., $\overline{OA}$·OB = 1). During this interval, the new physical main memory address MMU output may be latched into an external register.

Consistent with the above timing arrangement, the signals OA and OB, which define time T1, are applied to each of the transparent latches 12-102A, 12-102B and 12-102C. This enables the states of the corresponding pins to be sampled at the same time the firmware control word is being loaded into chip 12. When phase A goes high (i.e., signal OA = 1), external driver circuit 14-15 operates to force output signal DABSOX+XX active low or a binary ZERO. If connected, this causes one of the signals DABSOE+EE, DABSOF+EF or DABSOG+EG to be active low. When phase A is low (i.e., signal $\overline{OA}$ = 1), the outputs of adder stages 13, 14 and 15 are applied to pins 3, 2 and 68, respectively.

Now the operation of the present invention will be considered in greater detail relative to providing several levels of expanded functionality. In a first case, it is assumed that chip 12 is connected to provide a first level of functionality wherein the MMU address capability is expanded or extended by one address bit, so that it now has 21 bits of addressing, as shown, in FIG. 3b. In this case, external driver circuit 14-15 is wired to pin 3 of chip 12 which applies signal DABSOE+EE to that pin. The remaining unused pins 2 and 68 remain unconnected.

According to the present invention, pin 3 will now be time shared. During non-system time defined by phase A being high (i.e., OA = 1), external driver circuit 14-15 is enabled to drive pin 3 to a predetermined state (i.e., active low), treating it as if it were a control bit or any option bit. In this case, it can be viewed as a special type of option bit. When signal DABSOE+EE is driven active low, a binary ZERO signal is latched into latch 12-102A at time T1. Simultaneously, binary ONES are latched into latches 12-102B and 12-102C, since there is nothing tied to pins 2 and 68. That is, the voltage +V is applied to the inputs of both latches.

During system time defined by phase A being low (i.e., $\overline{OA}=1$), all of the address conditions are examined. At this time, the output EL of latch E is low (i.e., a binary ZERO) while the outputs FL and GL of latches F and G are high (i.e., binary ONES). Thus, adder stage 13 is permitted to generate address bit 21 (i.e., signal MM21) without producing an error condition. That is, the binary ZERO state of signal EL inhibits AND gate 12-240 from forcing error signal T15E to a binary ONE. The generated address signal MM21 is applied to pin 3 via tristate buffer circuit 12-200 during system time.

However, if adder stage 13 generates a carry out, this produces a trap error condition. That is, since both latches 12-102B and 12-102C are at binary ONES, AND gate 12-242 forces error signal T15E to a binary ONE when adder stage 13 forces carry out signal COE to a binary ONE. This indicates that the address range has been exceeded. As seen from FIG. 2d, this conditions the memory control circits of block 12-4 to force MEM-KILL signal to a binary ONE. As mentioned, this signal which is applied to pin 34 may be used to prevent the system from performing a memory access operation (either read or write).

Also, it will be noted that the generation of address bit 22 or 23 (i.e., signals MM22, MM23) by adder stage 14 or 15 also produces an error. That is, when address bit 22 (MM22) is forced to a binary ONE, AND gate 12-244 is conditioned by the binary ONE states of latch output signals FL and GL to force error signal T15E to a binary ONE. Similarly, when address bit 23 (MM23) is forced to a binary ONE, AND gate 12-248 is conditioned by the binary ONE state of latch output signal GL to force error signal T15E to a binary ONE. Also, the generation of a carry out from either adder stage 14 or 15 also produces an error. That is, when a carry out signal COF is a binary ONE, AND gate 12-246 forces error signal T15E to a binary ONE. Similarly, when adder stage 15 forces carry out signal COG to a binary ONE, this ungated signal forces error signal T15E to a binary ONE.

In a second case, it will be assumed that chip 12 is connected to provide a second level of functionality wherein the MMU address capability is extended by two address bits, so that it now has 22 bits of address as illustrated by FIG. 3c. In this case, external driver circuit 14-15 is wired to pin 2 of chip 12 which applies signal DABSOF+EF to that pin. Pins 3 and 68 remain unconnected to external driver circuit 14-15.

According to the present invention, now pins 2 and 3 will be time shared. Again, as previously described, external driver circuit 14-15 is enabled to drive pin 2 active low. When signal DABSOF+EF is driven active low, a binary ZERO signal is latched into latch 12-102B at time T1. Simultaneously, binary ONES are latched into latches 12-102A and 12-102C, since there is nothing tied to pins 3 and 68 during phase A high time.

Again, during system time, all of the address conditions are again examined. At this time, the output FL of latch F is low (i.e., a binary ZERO), while outputs EL and GL of latches E and G are high (i.e., binary ONES). When adder stage 13 generates as an output, address bit 21, the binary ZERO output from latch F inhibits AND gate 12-240 from generating an error signal. The same is true when adder stage 13 generates carry out signal COE. That is, latch F when a binary ZERO inhibits AND gate 12-242 from generating an error signal. Additionally, when adder stage 14 generates as an output, address bit 22, the latch F binary ZERO inhibits AND gate 12-244 from generating an error signal. The generated address bit signals MM21 and MM22 are applied to pins 3 and 2, respectively, via tristate buffer circuits 12-200 and 12-201 during system time.

However, should adder stage 14 generate carry out signal COF, representative of a twenty-third address bit, AND gate 12-246, conditioned by the binary ONE output from latch G, forces error signal T15E to a binary ONE. Also, either an output address bit 23 to a carry out signal COG from adder stage 15, representative of a twenty-fourth address bit, causes an error signal. That is, AND gate 12-248 is enabled by the binary ONE output from latch G to generate a trap error when address bit 23 is forced to binary ONE. Carry out signal COG when forced to a binary ONE directly results in the generation of trap error signal T15E.

In the third case, it is assumed that chip 12 is connected to provide a third level of functionality, wherein the MMU address capability is expanded by three address bits, so that it now has 23 bits of addressing as illustrated by FIG. 3d. In this case, external driver circuit 14-15 is wired to pin 68 of chip 12 which applies signal DABSOG+EG to that pin. The other unused pins 3 ad 3 remain unconnected to external tristate driver circuit 14-15.

According to the present invention, pins 3, 2 and 68 will now be time shared. During non-system time, defined by phase A being high, external driver circuit 14-15 drives pin 68 active low. When signal DABSOG-+EG is driven active low, a binary ZERO signal is latched into latch 12-102C at time T1. Simultaneously, binary ONES are latched int latches 12-102A and 12-102B, since there is nothing tied to pins 3 and 2 during phase A high time.

During system time defined by phase A being low, all of the address conditions are examined. As seen from FIG. 2d, the binary ZERO from latch G inhibits AND gates 12-240, 12-242, 12-244, 12-246 and 12-248. That is, it inhibits the generation of an error signal when any one of the address bits 21, 22 or 23 is a ONE or there is a carry out from adder stage 13 or 14. However, a carry out from adder stage 15 is allowed to cause an error. Again, the generated address bit signals MM21, MM22 and MM23 are applied to pins 3, 2 and 68, respectively, via tristate circuits 12-200, 12-201 and 12-203 during system time (i.e., $\overline{OA}=1$).

From the foregoing, it is seen how the functionality of chip 12 can be expanded through a series of steps which require utilization of a minimum number of previously unused pins. Such minimization is achieved by time-sharing different numbers of such pins according to the selected level of functionality established through the connection of a particular pin to external circuitry within the system into which chip 12 is placed.

Additionally, the same chip is backward compatible with older systems which require no connections of the unused pins. That is, the present invention enables chip 12 to operate within at least two systems having different functionality. The invention makes it possible to utilize chips developed with new technology at lower cost to be utilized in older systems without requiring any changes to be made to such systems. Thus, the invention permits the older systems to operate with newer chips with the attendant speed and cost advantages and no change to system functionality or operation.

It will be obvious to those skilled in the art that many changes may be made to the preferred embodiment without departing from the teachings of the present invention. Further, for example, while the preferred embodiment illustrated three distinct levels of functionality, such functionality is not limited to any specific number of unused pins. Also, the invention is not limited as to a particular type of chip processor organization, functionality or technology.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. An integrated circuit microprocessor chip developed using a technology advance relative to a similar previously designed chip, said microprocessor chip designed for use in both first and second computer systems, said microprocessor chip comprising:
   a plurality of external pins including a plurality of pins unused in said previous chip;
   a plurality of functional sections interconnected for performing processing operations, at least one of said functional sections providing functionality not found in said previous chip, said one functional section being coupled to each of said unused external pins;
   a plurality of compatibility mode means, each connected to said one functional section, to other ones of said sections and to a different one of said unused external pins, said plurality of said compatibility mode means when said microprocessor chip is installed in said second system in place of said previous chip with said unused pins unconnected, disabling said one functional section by conditioning other ones of said sections to operate in said second system in the same manner as in said previous chip at higher speed and performance attained by said advanced technology.

2. The chip of claim 1 wherein when said microprocessor chip is installed in said first system, one of said plurality of unused pins connected to said one functional section of said microprocessor chip is connected to external circuit means, said plurality of said compatability mode means conditioning said one functional section and other ones of said sections to operate with a level of said functionality selected by said external circuit means.

3. The chip of claim 2 wherein said one functional section is a memory management section for translating virtual addresses into physical addresses and which provides an increased physical address space according to said selected level of functionality.

4. The chip of claim 3 wherein said memory management section connects to each of said unused external pins for receiving and generating additional address bits to provide said increased physical address space according to said selected level of functionality.

5. The chip of claim 2 wherein said other ones of said section includes an error detection section coupled to said plurality of compatability mode means and to said one functional section, said error detection section generating an output signal indicating an illegal access under a plurality of sets of conditions selected by said plurality of compatibility mode means as a function of the system in which said microprocessor chip is installed and said selected level of functionality.

6. The chip of claim 5 wherein said other ones of said sections include a memory control section, said memory control section being coupled to said error detection section and to one of said used external pins for providing signals to prevent the addressing of an unavailable resource, said error detection section conditioning said memory control section to generate signals according to said output signal received from said error detection section.

7. The chip of claim 5 wherein each of said plurality of compatibility mode means includes:
   a voltage source; and,
   latching means having at least a pair of input terminals and an output terminal, one of said input terminals being connected to said different one of said unused external pins in common with said voltage source and said one functional unit, the other ones of said input terminals being connected for receiving a first clocking signal defining a non-system time interval, and said output terminal being connected to said error detection section, each of said latching means when installed in said second system being switched to a first predetermined state in response to said first clocking signal from said second system for enabling said error detection section to generate said output signal in response to signals indicative of a first set of conditions generated within said one functional unit and said latching means when installed in said first system being selectively switched to a second predetermined state as a function of said selected level of functionality in response to said first clocking signal from said first system for disabling said error detection section from generating said output signal in response to said signals indicative of said first set of conditions.

8. The chip of claim 7 wherein said one functional section includes a plurality of adder stages in addition to those present in said previous chip, said stages connected to said error detection section and a corresponding number of output means, each connected to said different one of said unused external pins and to said error detection section, said number of output means providing signals corresponding to the most significant bits of said adder, said additional stages being connected to apply carry out signals to said error detection section, each of said latching means when in said first predetermined state allowing the application of one of said most significant bits together with said carry out signals to produce an error indicative of said first set of conditions and said latching means when in said second predetermined state inhibiting the application of said one of said most significant bits to produce said error indicative of a second set of conditions.

9. The chip of claim 8 wherein each of said number of output means includes tristate driver circuit means connected to a corresponding one of said additional stages, to said different one of said unused external pins and for receiving a second clocking signal from said first system defining a system time interval, each of said tristate driver circuit means being conditioned by said second clocking signal to apply an output address signal corresponding to one of said most significant bits during said system time interval.

10. An integrated circuit chip developed using an advanced technology which produces high performance and lower cost relative to a similar prior microprocessor chip used in an existing computer system and usable in both new and existing computer systems, said chip comprising:
   a plurality of external pins including n number of pins unused in said previous chip;
   a plurality of functional sections interconnected for performing processing operations, at least one of said functional sections providing functionality not found in said prior chip in said existing system, said one of functional section having n number of stages connected to provide n levels of added functionality, said one functional section being coupled to each of said external pins which are unused in said prior chip in said existing system; and,
   n number of compatibility mode means each connected to a different one of said n number of stages of said one functional section, to other ones of said sections, said n number of compatibility mode means when said chip is installed as a replacement for said prior chip in said existing system without change, being conditioned by the states of said n number of unused pins to disable said n stages of said one functional section by conditioning other ones of said sections to generate the same responses in said existing system as said previous chip and provide said higher performance and lower cost.

11. The chip of claim 10 wherein when said chip is included in said new system, one of said n number of unused pins of said chip is selected to connect to external circuit means to provide a specified level of added functionality, said n number of said compatibility mode means conditioning certain ones of said n stages of said one functional section and other ones of said sections to operate with said added functionality defined by said external circuit means.

12. The chip of claim 11 wherein said one functional section is a memory management section for translating virtual addresses into physical addresses and which provides an increased physical address space according to said selected level of functionality.

13. The chip of claim 12 wherein said memory management section connects to each of said unused external pins for receiving and generating additional address bits to provide said increased physical address space according to said selected level of functionality.

14. The chip of claim 11 wherein said other ones of said sections includes an error detection section coupled to said n number of compatibility mode means and to said n stages of said one functional section, said error detection section generating an output signal indicating an illegal access under a plurality of sets of conditions selected by said n number of compatibility mode means as a function the system in which said chip is installed and said selected level of functionality.

15. The chip of claim 14 wherein said other ones of said sections include a memory control section, said memory control section being coupled to said error detection section and to one of said used external pins for providing signals to prevent the addressing of an unavailable resource, said error detection section conditioning said memory control section to generate signals according to said output signal received from said error detection section.

16. The chip of claim 14 wherein each of said n number of compatability mode means includes:
   a voltage source; and,
   latching means having at least a pair of input terminals and an output terminal, one of said input terminals being connected to said different one of said unused external pins in common with said voltage source and said one functional unit, the other one of said input terminals being connected to receive a first clocking signal defining a non-system time interval, and said output terminal being connected to said error detection section, each of said latching means when installed in said existing system being switched to a first predetermined state in response to said first clocking signal from said existing system for enabling said error detection section to generate said output signal in response to signals indicative of a first set of conditions within said one functional unit and said latching means when installed in said new system being selectively switched to a second predetermined state as a function of said selected level of functionality in response to said first clocking signal from said new system for disabling said error detection section from generating said output signal in response to said signals representative of said first set of conditions.

17. The chip of claim 16 wherein said one functional section includes an adder having said n number of stages connected to said error detection section and a corresponding number of output means, each connected to said different one of said unused external pins and to said error detection section, said number of output means providing signals corresponding to the most significant bits of said adder, said n number of stages being connected to apply carry out signals to said error detection section, each of said latching means when in said first predetermined state allowing the application of one of said most significant bit together with said carry out signals to produce an error indicative of said first set of conditions and said latching means when in said second predetermined state inhibiting the application of said one of said most significant bits to produce said error indicative of a second set of conditions.

18. The chip of claim 17 wherein each of said number of output means includes tristate driver circuit means connected to a corresponding one of said n number of stages, to said different one of said unused external pins and for receiving a second clocking signal from said new system defining a system time interval, each of said tristate driver circuit means being conditioned by said second clocking signal to apply an output address signal corresponding to one of said most significant bits during said system time interval.

19. A method of constructing an integrated circuit microprocessor chip constructed using new technology, said chip having a plurality of levels of increased new functionality for utilization in a newly designed system and backward pin compatibility with an earlier designed integrated circuit microprocessor chip designed for use in a first computer system and not containing said new functionality, said method comprising the steps of:
   providing a plurality of external pin terminals unused in said earlier microprocessor chip which are to be connected in a system designed to utilize said new functionality;

providing a plurality of functional units interconnected to perform processing operations, at least one of said units being constructed to have a plurality of sections to provide said plurality of levels of new functionality;

connecting said one functional unit to said plurality of unused external pin terminals;

connecting each of a plurality of compatibility mode means to a different one of said unused external pin terminals, to said one functional unit and to another one of said functional units; and, constructing each of said plurality of compatability mode means to generate a disabling signal in response to said different one of said unused external pin terminals when said chip is installed in said first system without any change for inhibiting said plurality of levels of new functionality by enabling said another one of said functional units to provide responses identical to said earlier designed chip for operation within said first computer system at the high speed and performance attained by said new technology.

20. The method of claim 19 wherein said step of constructing each of said plurality of compatibility mode means further includes the steps of;

providing a voltage source and latching means in said each compatibility mode means;

connecting an input of said latching means to said different one of said unused external pins and an output of said latching means to said another one of said functional units;

connecting said voltage source to said different one of said unused external pin terminals in common with said input of said latching means so that when said chip is installed in said first computer system, said voltage source switches said latching means to a first state generating said disabling signal for inhibiting an output from one of said plurality of sections; and, connecting only one of said unused external pin terminals of said chip to an external circuit when installed in said newly designed system to provide a desired level of new functionality, the corresponding one of said latching means switching to a second state generating a signal for enabling a number of said plurality of sections to provide said desired level of new functionality.

* * * * *